(12) United States Patent
Scherman

(10) Patent No.: US 6,637,749 B2
(45) Date of Patent: Oct. 28, 2003

(54) SEAL FOR CLEAN-IN-PLACE ENCLOSURE FOR A PACKAGING MACHINE

(75) Inventor: Terrance Scherman, Cedar Rapids, IA (US)

(73) Assignee: International Paper Company, Stamford, CT (US)

( * ) Notice: Subject to any disclaimer, the term of this patent is extended or adjusted under 35 U.S.C. 154(b) by 31 days.

(21) Appl. No.: 09/977,412

(22) Filed: Oct. 15, 2001

(65) Prior Publication Data

US 2003/0071420 A1 Apr. 17, 2003

(51) Int. Cl.[7] .................................................. F16J 15/16
(52) U.S. Cl. ........................ 277/303; 277/510; 277/513; 53/393
(58) Field of Search ................................ 277/308, 510, 277/513, 531, 587, 910; 53/266.1, 393

(56) References Cited

U.S. PATENT DOCUMENTS

| | | | | |
|---|---|---|---|---|
| 754,981 A | * | 3/1904 | Eberhardt | 277/503 |
| 1,914,296 A | * | 6/1933 | Roy | 277/531 |
| 2,332,150 A | * | 10/1943 | Huff | 277/513 |
| 2,589,656 A | * | 3/1952 | Armstrong | 277/339 |
| 2,703,719 A | * | 3/1955 | Crothers | 277/622 |
| 2,739,855 A | * | 3/1956 | Bruning | 277/584 |
| 3,322,432 A | * | 5/1967 | Soguel | 277/586 |
| 4,745,944 A | * | 5/1988 | Francart, Jr. | 137/238 |
| 5,052,726 A | * | 10/1991 | Logsdon | 285/341 |
| 5,083,749 A | * | 1/1992 | Linderman et al. | 251/214 |
| 5,085,029 A | | 2/1992 | Esper | |
| 5,129,625 A | * | 7/1992 | Wood et al. | 251/214 |
| 5,809,743 A | | 9/1998 | Ylonen et al. | |
| 5,845,683 A | * | 12/1998 | Sundby et al. | 141/90 |
| 6,006,505 A | * | 12/1999 | Natterer | 53/559 |
| 6,094,892 A | | 8/2000 | Lees | |

FOREIGN PATENT DOCUMENTS

| | | |
|---|---|---|
| EP | 0 731 026 A1 | 9/1996 |
| EP | 0 863 332 A2 | 9/1998 |

* cited by examiner

Primary Examiner—Anthony Knight
Assistant Examiner—Alison K. Pickard
(74) Attorney, Agent, or Firm—Pitts & Brittian, P.C.

(57) ABSTRACT

A seal for the selective sealing of a rod which is reciprocatable within an opening through the wall of an enclosure such as the filling station of a packaging machine, the seal being actuatable to selectively provide a fluid-tight seal between the rod and the wall and release of the seal for free non-sealed movement of the rod within the opening. A method is disclosed.

11 Claims, 8 Drawing Sheets

SEAL FOR CLEAN-IN-PLACE ENCLOSURE FOR A PACKAGING MACHINE

FIELD OF INVENTION

This invention relates to packaging machines and particularly to seals for clean-in-place enclosures for packaging machines.

BACKGROUND OF INVENTION

Packaging machines of the form-fill-seal type generally involve the formation of a carton, filling the carton with a product, and thereafter sealing the carton. When the product is a food product, such as juice or milk, the interior of the carton is maintained clean. At the end of a production shift, or at the end of a given production run, or in other instances, it becomes necessary that the portion of the machine which is exposed directly to the product, particularly within a filling station of the machine, be cleaned and/or sterilized. The cleaning operation generally involves flushing clean water over and/or through the components within the filling station, followed by washing with chemicals, in some instances, and sterilization of the cleaned equipment by exposure to a sterilant such as high temperature water and/or a sterilant such as hydrogen peroxide.

Desirably, this cleaning and/or sterilization is accomplished without the disassembly or removal of one or more of the components of the filling station equipment. Following cleaning of the components, the cleaned and/or sterilized equipment is to be maintained clean until the machine is again placed into production. Toward these ends, it is common to encase the filling equipment of a packaging machine within a "clean-in-place" enclosure, which in most instances comprises a housing which is capable of being made fluid-tight, and within which the sterilized equipment is housed. During a filling operation, a portion of this housing is open for the movement of cartons into and out of the enclosure, hence through the filling station. This opening through which the cartons pass is provided with a removable cover which, when in place, renders the entire housing fluid-tight.

In a high-speed packaging machine, empty cartons are moved via a conveyor into the filling station at a location beneath one side corner of the enclosure. When so located, the bottom end of the carton is engaged by a lift arm mounted on the end of a first vertically oriented reciprocative lift rod. Substantially simultaneously, the top end of the carton is engaged by a retainer which is mounted on the end of a second vertically oriented reciprocative lift rod, thereby capturing the carton between the lift arm and the retainer. The first and second lift rods move upwardly from the conveyor and move the captured carton into the filling station enclosure. This action is rather dynamic and each carton must be grasped and held substantially stationary within the enclosure.

Within the enclosure, the carton is filled with product. Thereafter, the first and second lift rods are moved downwardly to redeposit the filled carton on the conveyor. Once the filled carton is deposited onto the conveyor, the lift arm and the retainer disengage from the carton and remain in position to engage and move a further empty carton into and out of the filling station enclosure. Each of these reciprocative lift rods passes through the bottom wall of the enclosure. By reason of the high speed of the packaging machine, for example, 150 cartons filled per minute, each rod moves through its reciprocatory cycle at a high rate of travel and a large number of times over a short period of operating time, thereby creating severe wear upon any type of known sealing arrangement between a lift rod and the bottom wall of the enclosure.

During the time that a carton is in the enclosure and being filled, there is no need for sealing between each of the lift rods and the bottom of the enclosure, and in fact, it is most desirable that there be minimal or no frictional drag between a lift rod and any mounting of the lift rods in the bottom wall of the enclosure when the lift rods are in motion. However, for cleaning-in-place of the filling equipment housed with the enclosure, it is required that each lift rod be sealed fluid-tight relative to the bottom of the enclosure to avoid escape of cleaning fluid and sterilant from the enclosure to the ambient environment.

SUMMARY OF INVENTION

In accordance with one aspect of the present invention, there is provided a novel sealing structure which provides for minimal or no engagement of the seal with a lift rod which is reciprocating within an opening through the thickness of the bottom of the enclosure, but which is selectively actuatable to provide a fluid-tight seal between a lift rod and the bottom wall of the enclosure upon the commencement of a clean-in-place operation for the filling components housed within the enclosure. At noted hereinabove, the opening in the enclosure through which a carton is introduced to and removed from for filling of the carton, is readily closable, fluid-tight, as by a removable cover for this opening. Employing the present invention, no disassembly of any portion of the filling components housed with the enclosure is required, and the required sealing of the spacing between the lift rod and the bottom of the enclosure takes place automatically upon commencement of the clean-in-place operation. In similar manner, upon completion of the clean-in-place operation, either substantially simultaneously, or upon commencement of a subsequent operation of the overall packaging machine, the sealing structure of the present invention may be reversed and the lift rod released to freely reciprocate through the seal associated with the bottom wall of the enclosure.

In a specific embodiment, the sealing structure of the present invention includes a stationary seal plate adapter mounted to the bottom wall of the enclosure, a seal actuator/bearing component, and an annular resilient member, such as an "O"-ring, disposed within a radially tapered-wall annular space defined between the adapter and actuator/bearing component and encircling the lift rod passing through the sealing structure. The diameter of the "O"-ring is chosen to be greater than the outer diameter of the lift rod which is encircled by the "O"-ring. In operation, the "at rest" "O"-ring disengages itself from the outer circumference of the lift rod. Upon actuation, the actuator/bearing component is urged toward the seal plate adapter to thereby reduce the internal volume of the tapered-wall annular space and compress the "O"-ring into sealing engagement with the outer circumference of the lift rod, thereby effecting the desired sealing between the lift rod and the bottom wall of the enclosure.

DETAILED DESCRIPTION OF INVENTION

Figure 1:
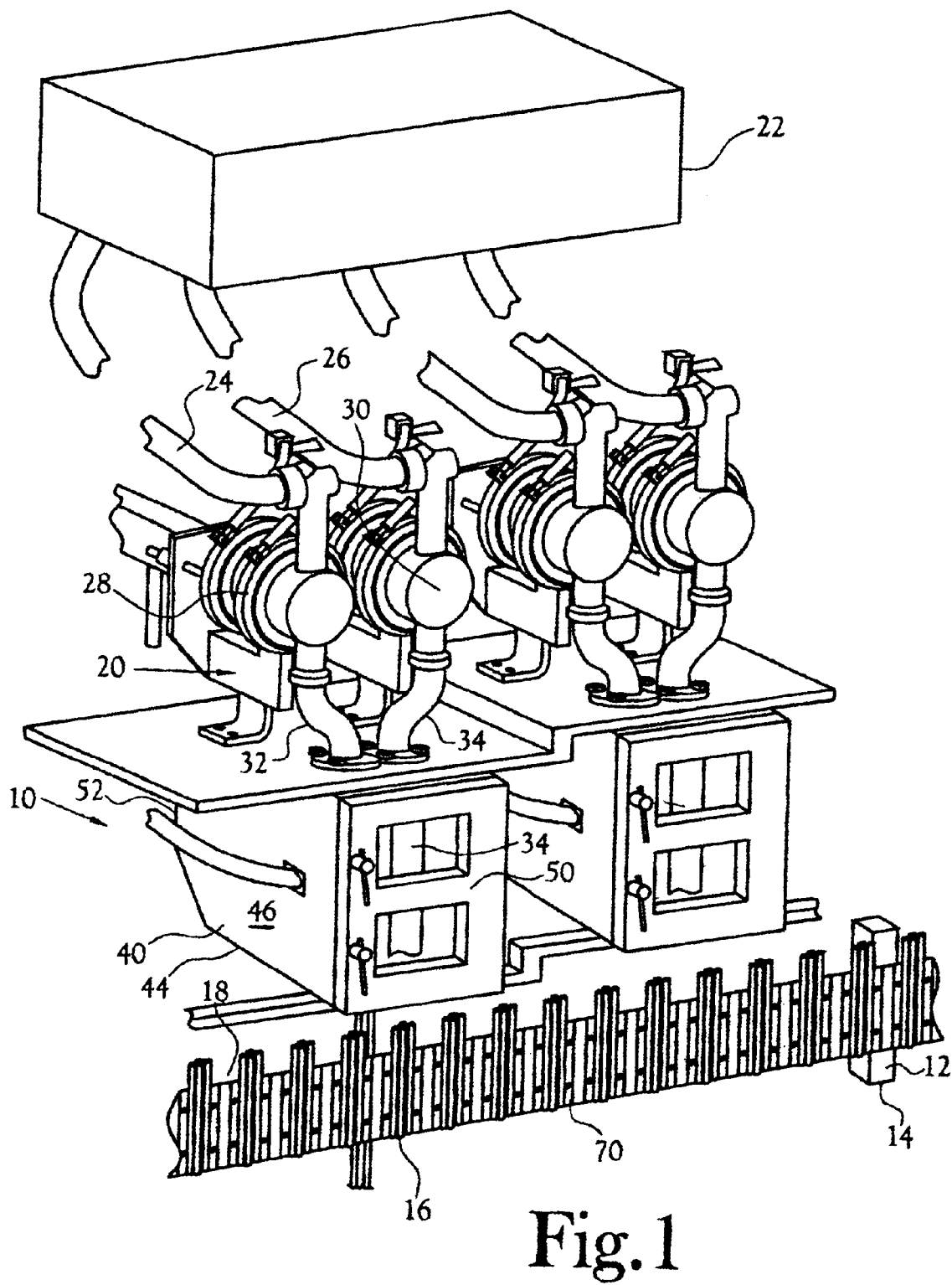
FIG. 1 is a representation of a portion of a packaging machine and depicting a filling station thereof, along with certain of the components of the present invention.

Referring initially to FIG. 1, there is depicted a typical packaging machine 10 for the formation of rectangular cartons 12, filling these cartons with a product, such as a juice or milk, and sealing of the filled cartons. More specifically, in the depicted machine and as is well known in the art, a plurality of individual carton blanks are erected into individual rectangular cylindrical cartons 12 which have their respective bottom ends 14 closed and sealed. These bottom-sealed cartons are disposed on a conveyor 16 with their open tops facing upwardly, for transport to a filling station 20.

The depicted filling station 20 includes a reservoir 22 of product from which flowable product is transferred via conduits 24, 26,(typical), through valving systems 28, 30 and into fill tubes 32, 34 whose terminal ends 36, 38 are housed internally of an enclosure 40. In the embodiment depicted in FIG. 1, the machine is provided with two essentially identical enclosures at the filling station 20 and each enclosure is provided with two filling tubes that project into a respective enclosure. By this means, two cartons may be filled at the same time within each of the two enclosures, four cartons being filled simultaneously. If desired, more or fewer enclosures may be employed, as well as more or fewer filling tubes per enclosure.

Each enclosure 40 in the depicted embodiment includes a top wall 42. The fill tubes 32, 34 pass through this top wall and are sealed fluid-tight with respect to this top wall. Opposite the top wall, each enclosure is provided with a bottom wall 44. This bottom wall is joined to the top wall by opposite first and second side walls 46 and 48 and opposite front and rear walls 50 and 52, respectively (See also FIGS. 2, 3 and 4). Further in the depicted embodiment, the bottom wall is approximately one half the area of the top wall and extends from its juncture 54 with the front wall in the direction of the rear wall. The rear wall is approximately one half the area of the front wall and extends downwardly from its juncture 56 with the top wall. This structure defines a truncated open corner 58 of the enclosure between the terminal edge 60 of the bottom wall, the terminal edge 62 of the top wall and the opposite side walls. This truncated open corner thereby provides for ingress and egress of cartons into and out of the enclosure. A removable cover is provided for fluid-tight sealing the truncated open corner of the enclosure.

Figure 2:
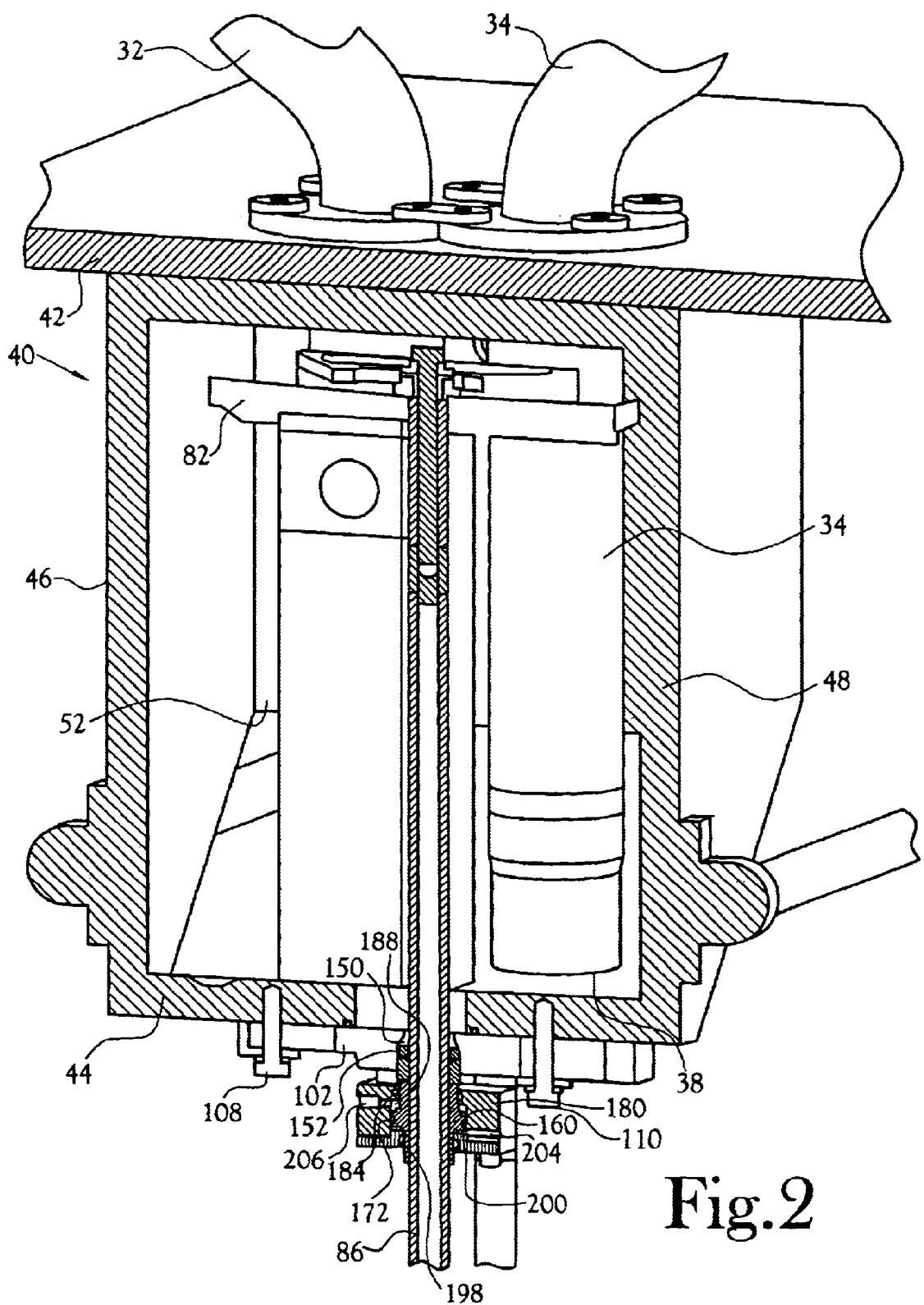
FIG. 2 is a representation, in section, of the clean-in-place enclosure for the packaging machine depicted in FIG. 1 and depicting various of the features of the present invention.
Figure 3:
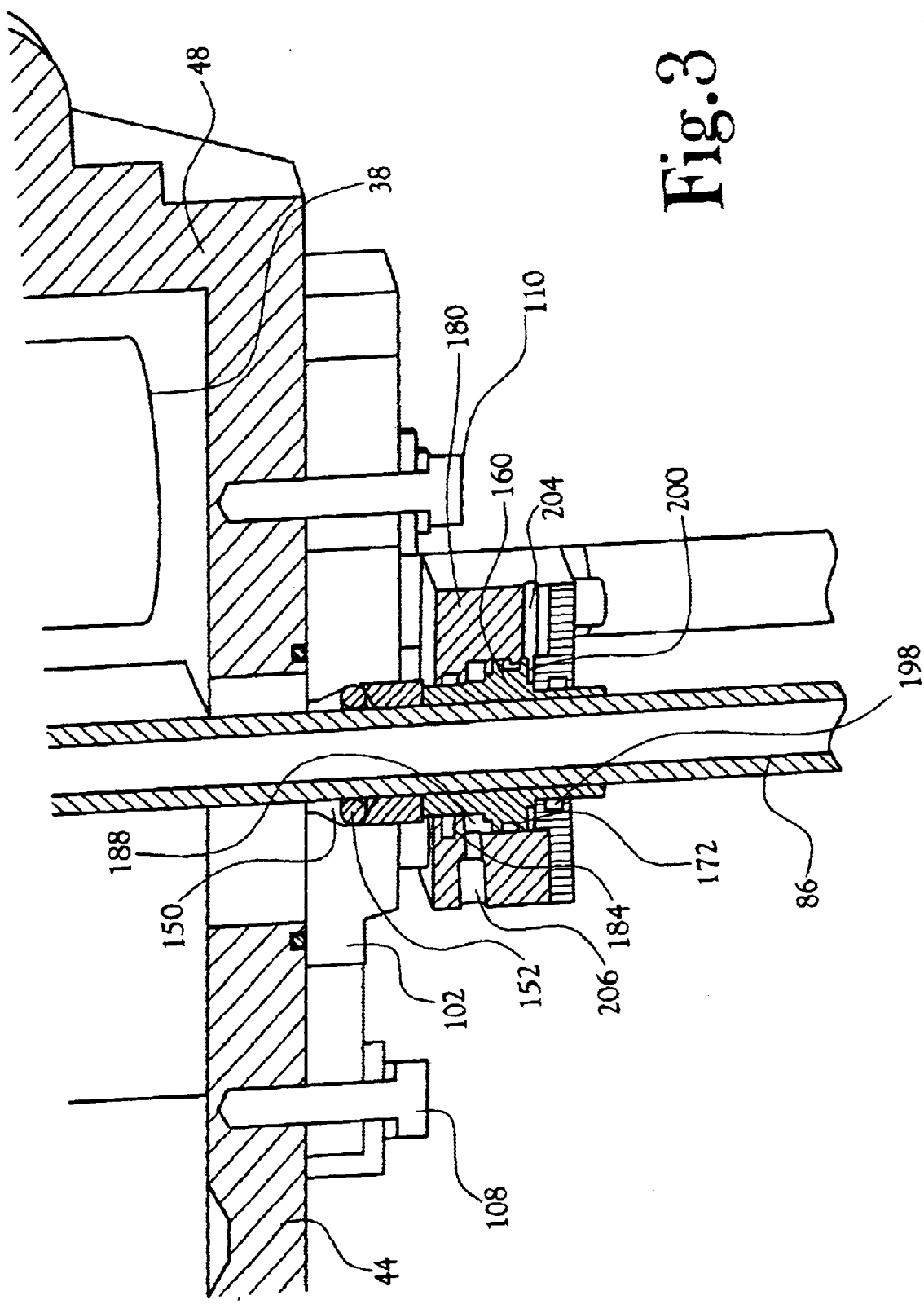
FIG. 3 is an enlarged view of a portion of the enclosure depicted in FIG. 2.
Figure 4:
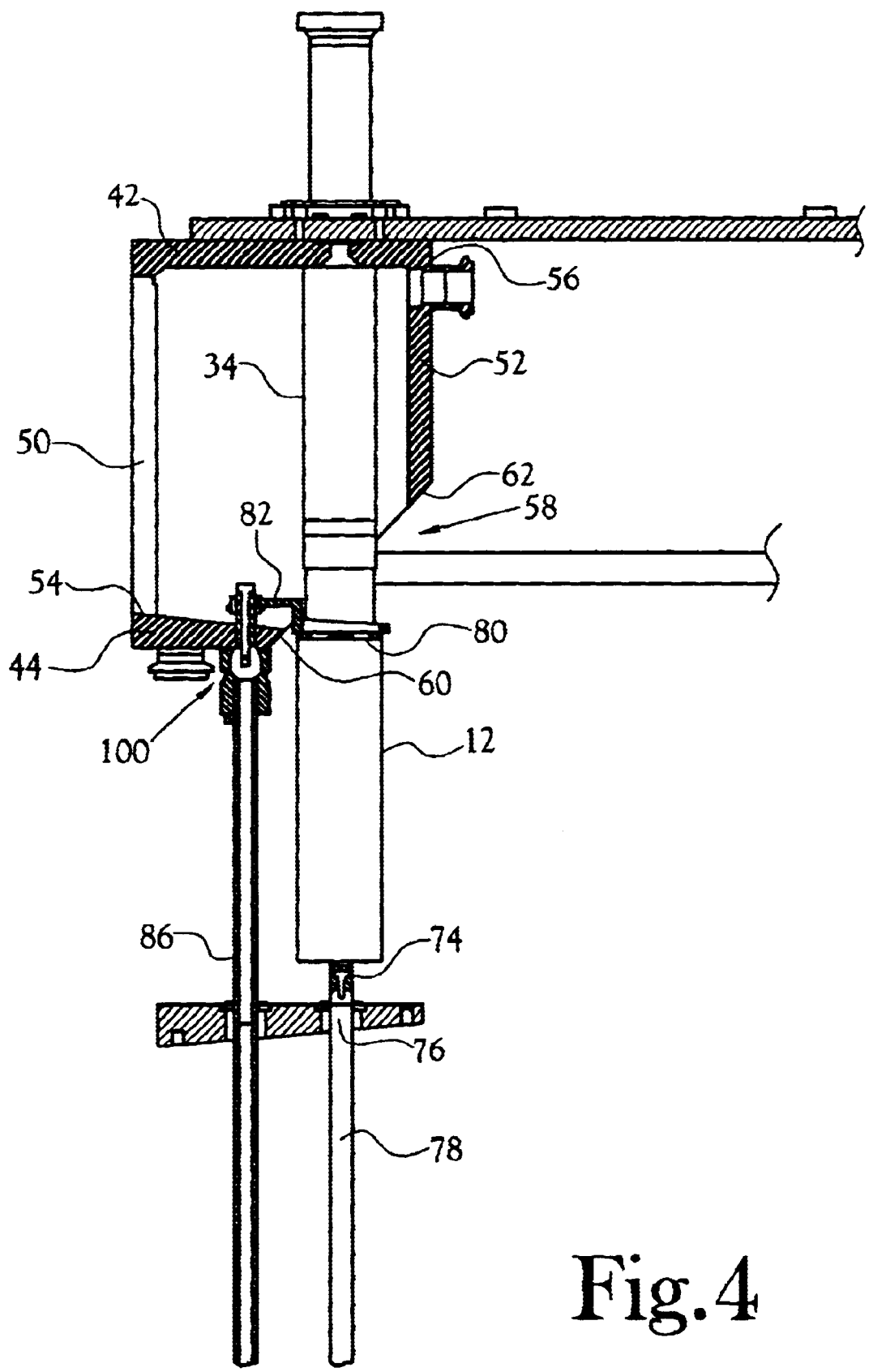
FIG. 4 is a side elevation view, in section, of a clean-in-place enclosure and various of the carton-filling components associated therewith and depicting various features of the present invention.
Figure 5:
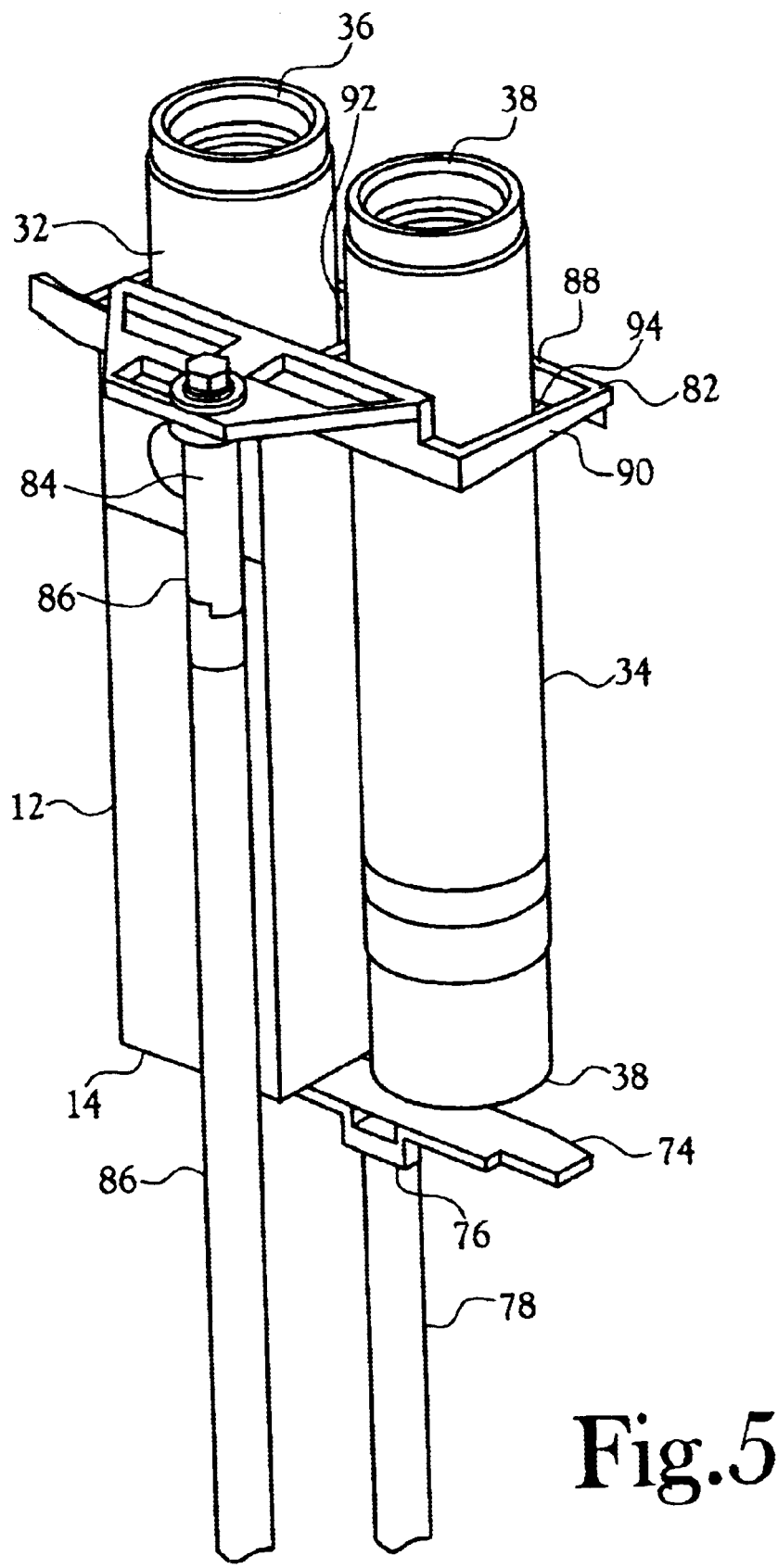
FIG. 5 is a representation of a first reciprocative lift rod having a carton pull-down device mounted on the top end thereof and a second reciprocative lift rod having a carton lift arm mounted on the top end thereof.
Figure 6:
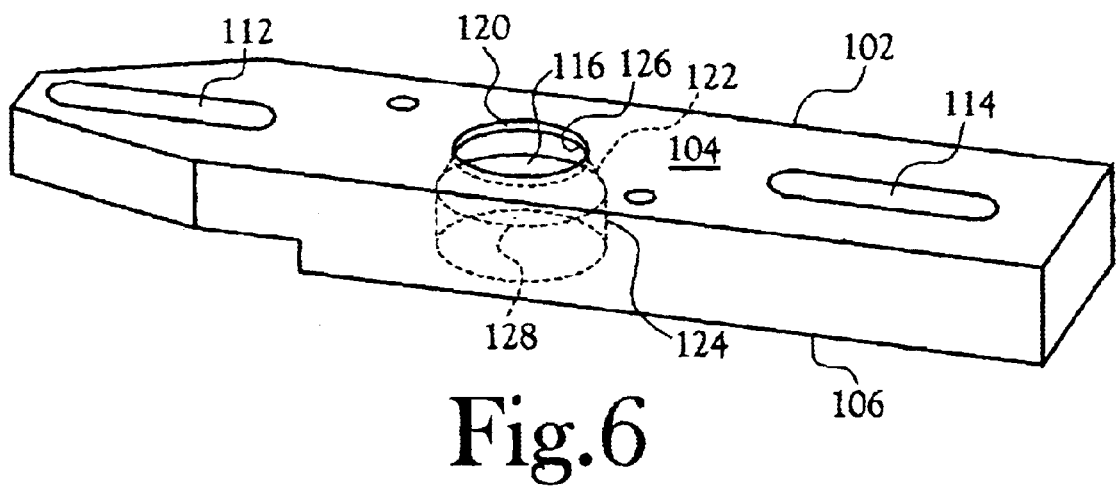
FIG. 6 is a representation of a seal plate adaptor as employed in one embodiment of the present invention.

Referring specifically to FIGS. 3 and 4, below each enclosure each carton 12 is engaged at its bottom end 14 by a lift arm 74 which is rigidly mounted on the upper end 76 of a first lift rod 78. In the depicted embodiment, the lift arm 74 simultaneously engages two cartons and lifts the two cartons into the enclosure for filling. For purposes of clarity, only one carton is depicted in FIGS. 1, 2, 3 and 5.

Substantially simultaneously with the engagement of the two cartons by the lift arm 74, the top end 80 of each of these two cartons is engaged by a pull-down frame 82 which is mounted on the top end 84 of a second lift rod 86. The depicted pull-down frame is generally of planar geometry, having top and bottom surfaces 88 and 90, respectively. The depicted frame is provided with two openings 92 and 94, each being sized to permit the frame to receive therein the terminal end of one of the stationary fill tubes disposed within the enclosure and to further permit the frame to move along the length of respective ones of the fill tubes 32 and 34. Notably, each of these openings is of rectangular geometry and of a size which provides for the bottom surface 90 of the frame adjacent each opening to engage the top end of a carton, thereby preventing the carton from moving upwardly with respect to the frame and to permit downward movement of the frame to urge the carton downwardly for the purpose, among others, of enhancing the rate of filling of a carton, without excessive spillage of product fed into the carton via a fill tube. Thus, the reciprocatory cycle of each of the lift rods 76 and 84 are independently controlled.

Referring to FIGS. 2, 3 and 4 specifically, it will be noted that only the second lift rod 86 passes through the bottom wall 44 of the enclosure. In accordance with one aspect of the present invention, this lift rod 86 is provided with a selectively activated seal 100 between the lift rod 86 and the bottom wall 44 of the enclosure.

Referring yet to FIGS. 2 and 3, one embodiment of a seal embodying various features of the present invention includes a seal plate adapter 102 which comprises an elongated plate member having top and bottom surfaces 104,106 and is adapted to be stationarily mounted to the bottom wall of the enclosure as by bolts or other equivalent fasteners 108,110 which pass through slots 112,114 that extend through the thickness of the plate. Generally centrally of the plate, there is defined a throughbore 116 having an inner wall, which in the depicted embodiment, is defined by first, second and third wall portions 120,122, and 124, respectively. The first portion 120 of the inner wall of the throughbore 116 extends inwardly of the throughbore from the top surface 104 of the plate only a short distance sufficient to define a straight cylindrical geometry wall portion 120 of limited diameter. From the innermost edge 126 of the first wall portion, the inner wall of the throughbore flares outwardly and downwardly into the throughbore to define a tapered wall portion 122. The innermost edge of the tapered surface defines a juncture 128 with the innermost edge of the third portion 124 of the wall of the throughbore, whereupon the third wall portion 124 extends from this juncture to the surface 106 of the bottom wall of the plate. This third wall portion 124 is of a straight cylindrical geometry.

Figure 7:
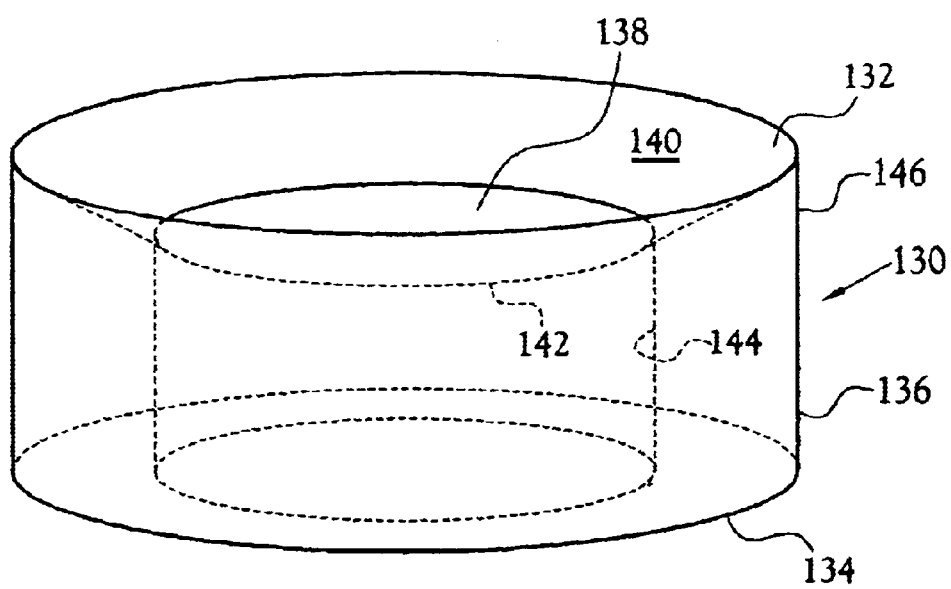
FIG. 7 is a representation of an actuator/sealing component as employed in one embodiment of the present invention.

The seal 100 further includes an actuator/bearing component 130 which, as depicted in FIG. 7, comprises a ring having top and bottom surfaces 132, 134, respectively, and an outer wall 136. This ring is provided with a central opening 138 which extends through the thickness of the ring. The top surface 132 of the depicted ring defines a tapered surface 140 which extends outwardly and upwardly from a juncture 142 with the inner wall 144 of the central opening 138 of the ring. Notably, the taper of this surface of the ring is opposite the taper of the second portion 122 of the inner wall of the throughbore of the adapter plate. Further, the outer diameter of the ring is chosen to permit slidable receipt therein of at least a portion of the top end 146 of the ring within that portion of the throughbore which is defined by the third wall portion 124 thereof. In this manner, the tapered wall of the second wall portion 122 of the throughbore of the plate and the tapered surface 140 of the ring may be disposed in facing relationship to one another to define therebetween an annular space 150 (FIG. 3) having opposing tapered surfaces. Further, depending upon the spatial separation of these tapered surfaces from one another, the annular space 150 defined therebetween may include a straight cylindrical wall section 152 of the third wall portion 124 of the throughbore. It will be recognized that when these tapered surfaces are physically spaced apart from one another, the effective diameter of the annular spacing 150 therebetween will be substantially equal to the inner diameter of the third wall portion 124 of the throughbore. Moreover, when the tapered surfaces are physically separated from one another, the length of the annular space therebetween is "maximized".

In the seal of the present invention, the throughbore of the plate and the central opening through the actuator/bearing component are in register and the lift rod 86 is received therethrough and reciprocates therein. In accordance with a further aspect of the present invention, there is provided a resilient member, such as an "O"-ring, 152 disposed within the annular space 150 between the facing tapered surfaces of the throughbore and the actuator/sealing component. This "O"-ring is chosen to having an inner diameter which is greater than the outer diameter of the lift rod 86 which passes through the plate and the actuator/sealing component, and it encircles the lift rod reciprocating therethrough such that when the "O"-ring is relaxed, it does not engage the outer circumference 154 of the lift rod 86. To ensure this effect, the inner diameter of the third wall portion 124 of the throughbore of the adapter plate is chosen to be at least equal to, or greater than, the outer diameter of the "O"-ring 152 when the "O"-ring is in its relaxed state. Further, the cross-sectional diameter of the "O"-ring is chosen to ensure that when the "O"-ring is relaxed, its outer surface will engage both of the tapered surfaces 122 and 140 thereby tend to move the adapter/sealing component 130 away from the tapered surface 122 of the throughbore, but without causing the inner circumference of the "O"-ring to engage the outer circumference of the lift rod. Generally, it is desired that the relaxed "O"-ring substantially fill the annular space between the tapered surfaces, but without the "O"-ring engaging the outer circumference of the lift rod.

The seal 100 further includes a piston member 160 which is generally of a hollow cylindrical geometry having a top annular surface 161 and is disposed in encircling relationship to the lift rod 86. The internal diameter of the piston member is chosen to provide at least partial alignment for the lift rod 86, while permitting free sliding movement between the piston and the lift rod. The outer circumference of the piston member is provided with first and second circumferential flanges 162, 164 disposed approximately midway between the opposite ends 166, 168 of the piston member and which are spaced apart from one another to define an annular channel 170 therebetween for the receipt therein of an annular sealing member 172, such as an "O"-ring.

Figure 8:
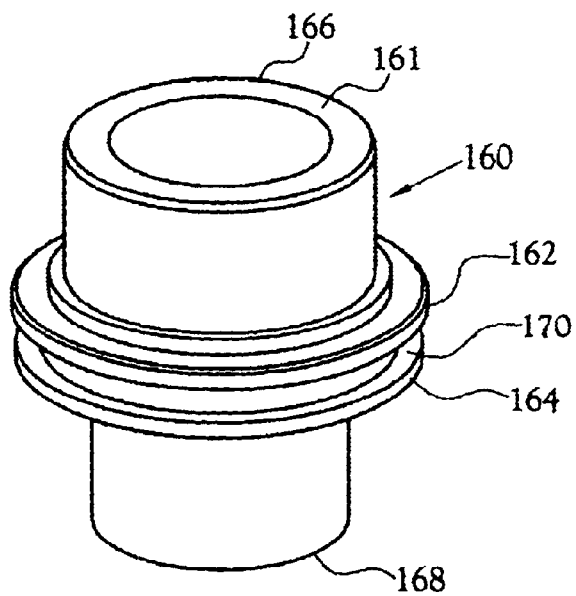
FIG. 8 is a representation of a piston member employed in the actuation of the seal of the present invention.
Figure 9:
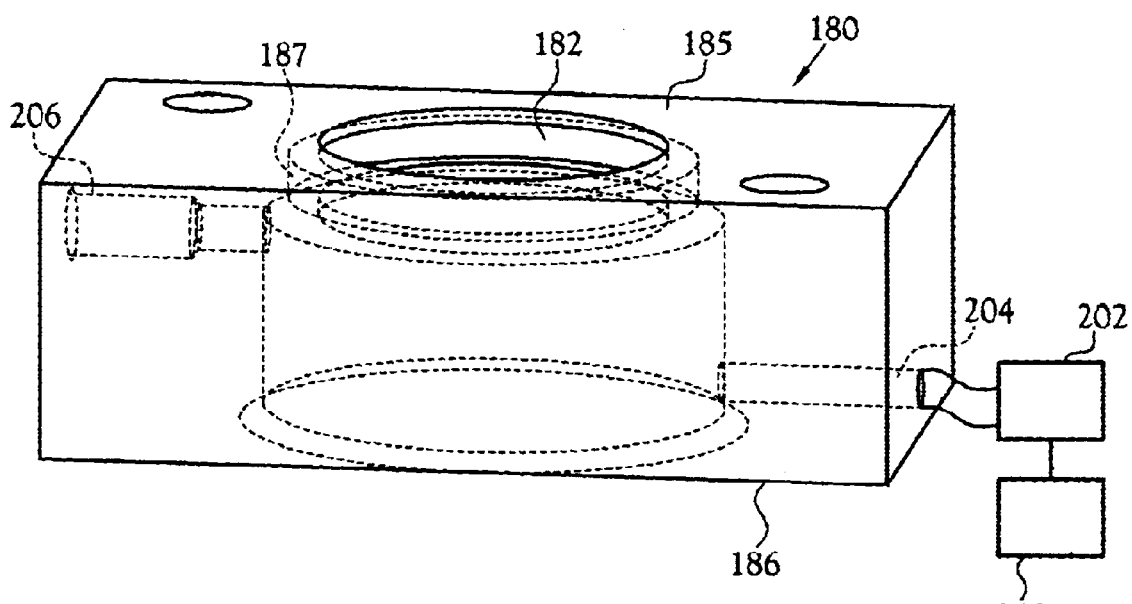
FIG. 9 is a representation of a housing for the piston member depicted in FIG. 7.
Figure 11:
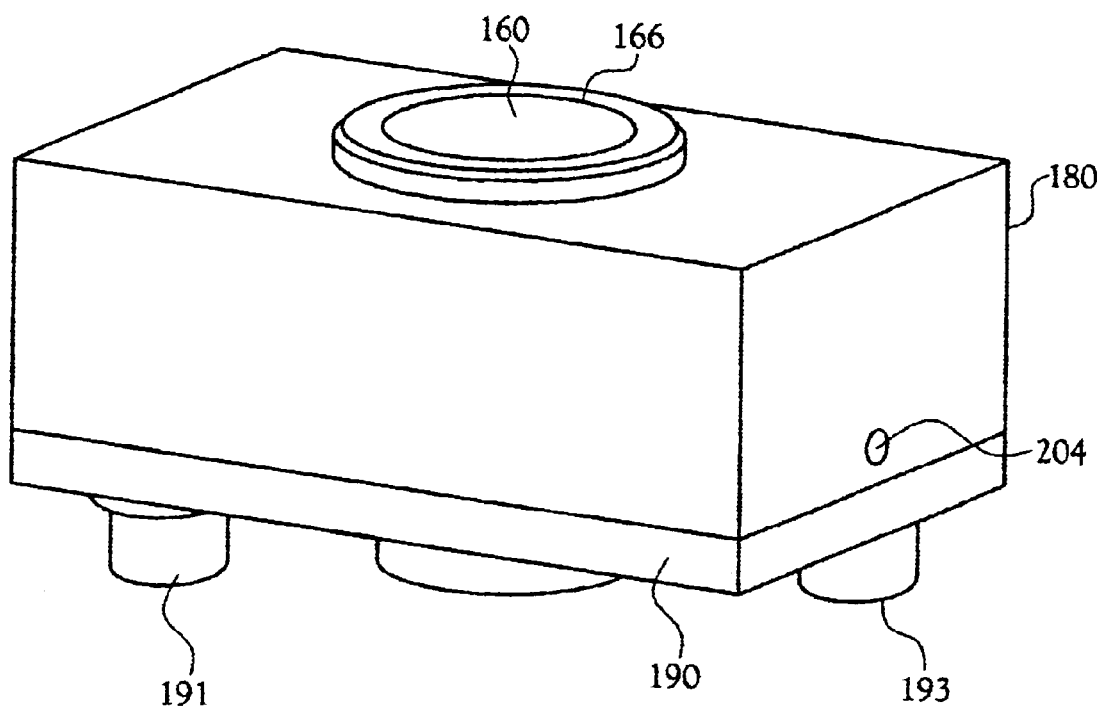

As depicted in FIGS. 8, 9 and 11, the piston member is reciprocatably mounted within a housing 180 having a generally central opening 182 which extends between the top and bottom surfaces 185, 186 respectively of the housing. This opening is geometrically complementary to the outer circumferential geometry of the piston member to the extent that the piston member will reciprocate within the opening through the housing. To this end, the opening 182 through the housing includes an annular seal 184 disposed in a circumferential groove 187 in that portion of the inner wall of the housing adjacent the top surface of the housing. This seal 184 engages the top portion of the outer circumference of the piston member to provide fluid-tight sealing therebetween (FIG. 2). Between this seal 184 and the bottom 186 of the housing, the inner circumference of the opening through the housing slidably receives therein the circumferential flanges 162, 164, and the seal 172 captured therebetween, to define a fluid-tight annular chamber 188 between the seal 172 and the seal 184 associated with the top end of the piston.

Figure 10:
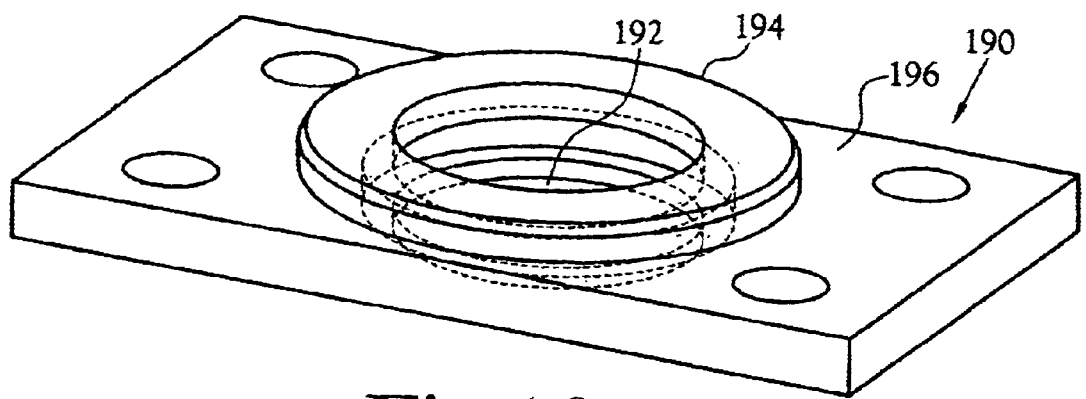
FIG. 10 is a representation of a bottom plate for the housing depicted in FIG. 8; and, FIG. 11 is a representation of a subassembly including the piston depicted in FIG. 7 contained with the housing depicted in FIGS. 8 and 9.

Referring to FIGS. 10 and 11 the bottom 186 of the housing 180 is fitted with a closure plate 190 having a central opening 192 that is in register with the opening 182 through the housing 180. In the depicted embodiment, this bottom plate is removably mounted to the bottom surface of the housing as by bolts 191, 193 or other appropriate fasteners (FIG. 11). In the depicted embodiment, this bottom plate includes an annular projection 194 on the top surface 196 thereof which is provided with an annular seal 198 about its inner circumference. This annular projection is adapted to be received within that portion of the opening 182 adjacent the bottom 186 of the housing 180, and to receive the bottom end 168 of the piston 160 within its opening 192 with the annular seal 198 disposed between the outer circumference of the bottom end 168 of the piston 160 and the inner circumference of the opening 192 of the bottom plate 190. By this means, there is defined a further fluid-tight annular chamber 200 between the seal 172 associated with the flanges on the piston member and the bottom portion of the opening 182 through the housing 180.

Access to this further chamber 200 for purposes of the admission of pressurized fluid from a source 202 thereof located external of the housing is provided via an inlet port 204. An outlet port 206 is provided through the housing wall to provide for fluid communication from within the chamber 188 that is adjacent the top surface of the housing and on that side of the seal established at the circumferential flanges of the piston member, thereby permitting pressurized fluid admitted into the further chamber 200 to urge the piston upwardly within the housing 180 and to permit the influx of ambient atmosphere upon movement of the piston member downwardly within the housing.

The housing 180, with its bottom plate 190 affixed thereto is adapted to be mounted to the seal adapter plate 102, or by bolts or other fasteners (not shown) in a position whereby the top annular surface 161 of the piston may engage the annular bottom surface 134 of the actuator/bearing component and to provide a force against the actuator/bearing component which will urge the actuator/bearing component toward the tapered surface portion 122 of the inner wall of the adapter plate.

In the operation of the seal 100 of the present invention, at all times when the lift rod 86 which reciprocates through the seal is functioning, as established by the controller 210 for the packaging machine, no pressurized fluid is present in the chamber 200 within the housing 180. The absence of such pressurized fluid permits the piston member to be moved downwardly within the housing. Downward movement of the piston member is effectuated by means of the expansion of the "O"-ring disposed between the tapered surfaces of the throughbore 116 and the top surface 140 of the actuator/sealing component. That is, when there being no pressure applied via the piston member to the adapter/sealing component, the adapter/sealing component is free to move downwardly within the throughbore of the adapter plate. Under these circumstances, the "O"-ring is free to assume its relaxed state. The expansion of the "O"-ring to its relaxed state urges the adapter/sealing component and the piston member downwardly, maximizing the annular space within which the "O"-ring is disposed and the "O"-ring expands into disengagement with the lift rod passing through the seal. So long as the packaging machine is functioning to fill and seal cartons, the "O"-ring is free of engagement with the lift rod so that there is minimum, if any, wear and tear upon the "O"-ring.

Upon shut-down of the operation of the packaging machine, for instance to the end of a shift or the like, the controller 210 provides an appropriate signal to the source 202 of pressurized fluid, commonly air, to effect admission of pressurized fluid into the chamber 200 defined within the housing. This pressurized fluid urges the piston member upwardly within the housing, causing the top end 161 of the piston member to engage and urge the adapter/sealing component upwardly within the throughbore in the adapter plate. This action causes the tapered surface of the adapter/sealing component to engage the "O"-ring and urge this "O"-ring to move upwardly toward the tapered surface defined by the second wall portion 122 of the throughbore of the plate. This movement of of the "O"-ring causes the "O"-ring to become captured between the facing oppositely tapered surfaces and thereby compressed diametrically and circumferentially. This compression of the "O"-ring causes the "O"-ring to sealingly engage the outer circumference of the lift rod about which the "O"-ring is disposed and close off, fluid-tight, the bottom of the enclosure at the location of the passage of the lift rod through the bottom wall of the enclosure. This seal between the lift rod and the bottom wall of the enclosure remains until the controller for the packaging machine sends an appropriate signal to the source of pressurized fluid to cease the introduction of pressurized fluid into the chamber. Upon such cessation of the application of pressurized fluid to the chamber, the piston becomes free to move, thereby removing the compressive force against the "O"-ring and permitting the "O"-ring to seek its relaxed state. As the "O"-ring returns to its relaxed state, it expands and forces the adapter/sealing component downwardly and away from the tapered surface of the second wall portion of the throughbore, which, in turn, urges the piston downwardly within the housing. Further, the expansion of the "O"-ring to its relaxed state disengages the "O"-ring from the outer circumference of the lift rod 86.

Whereas the present invention has been described in specific terms for purposes of clarity and understanding, it will be recognized by one skilled in the art that various modifications and/or alternatives may be employed without departing from the substance of the invention. It is intended, therefore, that the present invention be limited only as set forth in the claims appended hereto.

What is claimed:

1. In a packaging machine including one or more components for the introduction of product into a carton, and including an enclosure housing the components, the enclosure including a bottom wall and a reciprocative member extending from a location within the interior of the enclosure and through an opening through the bottom wall of the enclosure to a further location external to the enclosure, the enclosure serving to periodically receive therein a fluid, the improvement comprising a seal disposed in encircling relationship to the reciprocative member, said seal including a seal plate adapter stationarily mounted to the bottom wall of the enclosure and including a throughbore defined through the thickness thereof, said throughbore being in register with the opening through the bottom wall of the enclosure, a seal actuator/bearing component including an opening extending therethrough, said throughbore defined in said seal plate adapter being in register with said opening defined in said seal actuator/bearing component, said throughbore in said seal plate adapter having a first inner wall portion adjacent the bottom wall of the enclosure which tapers radially outwardly and downwardly toward said seal actuator/bearing component and a non-tapered second inner wall portion which extends from, and is a straight cylindrical continuation of, said tapered wall portion toward said seal actuator/bearing component, said opening defined in said seal actuator/bearing component including an end wall portion which tapers radially outwardly and upwardly toward said seal plate adapter, and an outer circumferential wall adapted to be reciprocatively received within said non-tapered second inner wall portion of said seal plate adapter, said adjacent tapered wall portions of said seal plate adapter and said seal actuator/bearing component cooperatively defining internally of said seal plate adapter an annular space having facing oppositely tapered wall portions, surrounding the outer circumference of the reciprocative member, and a resilient member disposed within said annular space and encircling the outer circumference of the reciprocative member which reciprocates through said annular space, said seal actuator/bearing component being movable toward and away from said seal plate adapter to an extent whereby said resilient member either resides within said annular space in a relaxed state and out of material engagement with the reciprocative member which reciprocates through said annular space, or said resilient member is compressed between said oppositely tapered walls of said seal plate adapter and said seal actuator/sealing component and urged into sealing engagement with the reciprocative member which reciprocates through said annular space.

2. The improvement of claim 1 and including a motive component associated with said seal actuator/bearing component and adapted to selectively apply force against said seal actuator/bearing component to move said seal actuator/bearing component toward said seal plate adapter to thereby decrease the interior volume of said annular space and compress said resilient member toward sealing engagement with the reciprocative member.

3. The improvement of claim 2 wherein said motive component comprises a housing defining an annular chamber therein and a piston element which is reciprocatively mounted within said annular chamber and in encircling relationship to the reciprocative member.

4. The improvement of claim 3 and including a source of pressurized fluid and means connecting said annular chamber in fluid flow communication to said source of pressurized fluid, and a fluid flow controller interposed between said source of pressurized fluid and said annular chamber.

5. Sealing apparatus for producing a selectively actuatable fluid-tight seal between a stationary housing and the outer circumference of a reciprocative member passing through said housing comprising a stationary seal plate adapter having first and second opposite surfaces and a throughbore defined between said opposite surfaces, said throughbore including a portion of the inner circumferential wall thereof tapered radially outwardly and downwardly in a direction away from said first surface thereof and terminating short of said second surface thereof to further define a non-tapered continuation portion of the inner circumferential wall of said seal plate adapter adjacent its second surface, a seal actuator/bearing component having first and second opposite ends and an opening having first and second ends defined between said opposite ends of said seal actuator/bearing component, said first end of said opening including a circumferential wall portion thereof tapered radially outwardly and upwardly toward said first end of said seal actuator/bearing component, said second surface of said seal plate adapter and said first end of said seal actuator/bearing component being adjacent one another and with their respective throughbore and opening being in register, at least said first end of said actuator/bearing component being slidably disposed within said non-tapered portion of said throughbore through said seal plate adapter, to thereby collectively define an annular space within said throughbore through said seal plate adapter, a resilient member disposed within said annular space and encircling the outer circumference of a reciprocative member which reciprocates through said annular space, said seal actuator/bearing component being movable toward and away from said seal plate adapter in a manner and to an extent whereby said resilient member either resides within said annular space in a relaxed state and out of material engagement with the reciprocative member which reciprocates through said annular space, or said resilient member is compressed generally radially thereof between said tapered surfaces of said seal plate adapter and said seal actuator/bearing component to thereby urge said resilient member into sealing engagement with said reciprocative member which reciprocates through said annular space.

6. The sealing apparatus of claim 5 and including a housing having an internal chamber defined therein and a piston member reciprocatively disposed within said chamber, said piston member including a first end which is disposed in facing relationship to said second end of said seal actuator/bearing member whereby movement of said piston member within said chamber in a direction toward said seal actuator/bearing component produces movement of said seal actuator/bearing element into said throughbore of said seal plate adaptor to thereby reduce the internal volume of said annular space defined between said tapered surface of said throughbore through said seal plate adaptor and said oppositely tapered end of said seal actuator/bearing component and compress said resilient member into sealing engagement with said reciprocative member which reciprocates through said annular space.

7. The sealing apparatus of claim 5 and including a source of pressurized fluid and means operatively connecting said annular space to said source of pressurized fluid, and a fluid flow controller interposed between said source of pressurized fluid and said annular chamber.

8. The sealing apparatus of claim 7 wherein said fluid flow controller is activatable from a location remote therefrom.

9. The sealing apparatus of claim 6 wherein said piston includes a second end and includes an opening extending therethrough between said first and second ends, said opening receiving the reciprocative member for reciprocation in said opening.

10. A method for selectively sealing a reciprocative member with respect to a sealing apparatus disposed thereabout comprising the steps of disposing a seal plate having first and second opposite surfaces in fixed position relative to the reciprocative member, defining a throughbore between said opposite surfaces of said seal plate, providing said throughbore with a first inner wall portion which tapers radially outwardly from said first surface and downwardly toward said second surface, said first tapered wall portion terminating short of said second surface to define a non-tapered inner wall portion of said throughbore adjacent said second surface of said seal plate, encircling the reciprocative member with an annular actuator/seal component having first and second ends, said first end being at least partially received within said non-tapered wall portion of said throughbore, and encircling the reciprocative member, tapering said first end of said actuator/seal component radially outwardly and upwardly of said annular actuator/seal component whereby said tapered surface of said seal plate and said tapered end of said actuator/seal component face one another and define therebetween an annular space having oppositely tapered facing surfaces, disposing a resilient member within said annular space and in encircling relationship to the reciprocative member, providing a reciprocative piston member in operative relationship to said actuator/seal member for the application of pressure against said actuator/seal member to thereby move said actuator/seal member toward said seal plate, applying a force to said actuator/seal member sufficient to move said actuator/seal member toward said stationary seal plate and compress said resilient member between said facing tapered surfaces of said annular space and into sealing engagement with the reciprocative member.

11. The method of claim 10 and including the step of activating the movement of said piston member from a location remote therefrom.

* * * * *